Sept. 2, 1924.
C. W. TERRY
1,506,792
ELECTRICAL TESTING INSTRUMENT
Filed April 1, 1920
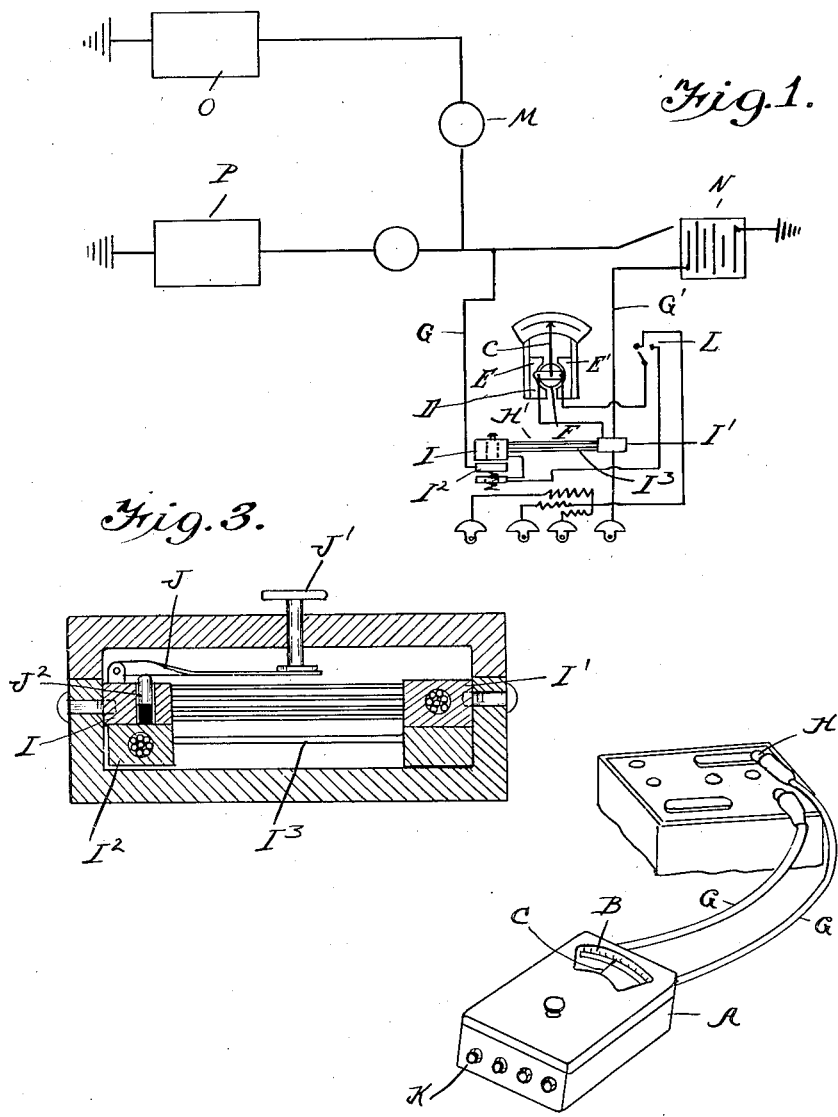
Inventor
Charles W. Terry
By Whittemore Hulbert + Whittemore
Attorneys Patented Sept. 2, 1924.

1,506,792

UNITED STATES PATENT OFFICE.

CHARLES W. TERRY, OF DETROIT, MICHIGAN, ASSIGNOR, BY MESNE ASSIGNMENTS, TO HYRATE MANUFACTURING COMPANY, A CORPORATION OF MICHIGAN.

ELECTRICAL TESTING INSTRUMENT.

Application filed April 1, 1920. Serial No. 370,457.

*To all whom it may concern:*

Be it known that I, CHARLES W. TERRY, a citizen of the United States of America, residing at Detroit, in the county of Wayne and State of Michigan, have invented certain new and useful Improvements in Electrical Testing Instruments, of which the following is a specification, reference being had therein to the accompanying drawings.

The invention relates to electrical testing instruments and it is the object of the invention to obtain a construction particularly adapted for use in testing and detecting trouble in different portions of electric systems on motor vehicles. It is usual with such electric systems to provide a storage battery, a generator for charging the same, a motor for starting the engine, ignition and lighting circuits and various other auxiliary devices. These several elements of the system are so inter-related that when there is failure in operation, it is sometimes difficult to detect and properly locate the cause of the trouble. For instance, if the car fails to start, this may be due to battery trouble or to the starting motor, or to the controlling switch. Again, if there is failure of current, this may be due merely to the fact that the battery is run down, or there may be some inherent defect in the battery.

It is the object of the invention to provide means for making all of the requisite tests in a single instrument. It is a further object to provide means for quickly and easily connecting the instrument into circuit and to avoid the necessity for shifting connections when the different tests are made. With these objects in view the invention consists in the construction as hereinafter set forth.

In the drawings:

Figure 1 is a diagram of an electric system for a motor vehicle, showing the manner of testing the same by my improved instrument;

Figure 2 is a perspective view of the instrument and its connections;

Figure 3 is a cross-section through the instrument.

A is a box or casing containing an electrical measuring instrument B, having the usual movable index hand C and cooperating scale markings. In common with all such instruments the indication is dependent upon the resistance of a shunt, through which a portion of the current is deflected. Inasmuch, however, as the current in the system varies greatly, depending upon the particular operation or the particular device which is in use, it would be impossible to make all of the various tests with an instrument having a shunt of unvarying resistance. Also, if the resistance of the shunt were sufficiently high for making certain tests, there would be great danger of burning out the instrument in making other tests; while, on the other hand, if the resistance were sufficiently low for the latter tests, there would be little or no indication of the former.

In my improved instrument I overcome the difficulty by providing a shunt of variable resistance, together with automatic means for holding the resistance normally low, while permitting a temporary adjustment to increased resistance.

In detail, D is a horse-shoe magnet having the segmental pole pieces E and E' embracing an armature F, to which the index hand C is attached. G and G' are the terminal connectors, preferably formed of heavy insulated cable, and which extend outward from the casing A, being preferably provided at their free ends with spring clamps H for quick attachment with the battery terminals or other part of the system. H' is a shunt connection of relatively low resistance which extends between the connectors G and G' and which as shown comprises the terminal blocks I, I' and I$^2$ and the resistor bars I$^3$ extending therebetween. Between the blocks I and I' there are a number of the bars I$^3$ in parallel, so as to form a low electrical resistance, but between the blocks I' and I$^2$ there is but a single bar having therefore a higher electrical resistance. The leads G and G' are attached, respectively, to the blocks I$^2$ and I' and the block I is normally in electrical contact with the block I$^2$, so that the current can pass through all of the bars I$^3$ in parallel. There is, however, provided a device for separating the blocks I and I$^2$ to compel the current to pass through the single bar I$^3$, this consisting of a lever J operated by a push button J' and actuating a pin J$^2$ passing through an aperture in the block I and pressing against the block I$^2$. The pin J$^2$ has an insulated lower end, so that when pressure is brought to bear the blocks I and I² will be both mechanically and electrically separated.

In use, the leads G and G' of the instrument are connected into the main circuit, preferably by disconnecting one of the battery terminals and connecting one of the clamps H of the leads G and G' to the battery terminal and the other to the end of the disconnected conductor. When so positioned, any current in the main circuit will pass partly through the low resistance shunt and partly through the measuring instrument. This will effect an indication of the starting current, but the charging current is too small in volume to be properly indicated. If, however, the operator presses the button J', this operating through the lever J and pin J² will separate the blocks I and I² so that the resistance of the shunt is increased many times. This enables the instrument to be used for measuring currents of smaller volume, but the high resistance is in circuit only as long as the button is pushed down and when this is released, the low resistance is automatically cut in. Therefore, it would be impossible for the operator to carelessly injure the instrument by leaving in the high resistance when there is a large current volume in the circuit.

In the tests thus far described the instrument is used as an ammeter, but there are various other tests which it is desirable to make in connection with motor vehicle electric systems. To adapt the instrument for these tests it is provided with a series of binding posts K, etc., to which connections may be led from various parts of the system. A switch L is arranged at one side of the instrument for changing the instrument from the main circuit to the binding-post circuits.

Some of the specific tests which can be made are as follows: To test the battery current, after the instrument is connected into the main circuit, as before described, the starting switch M is closed so that the current from the battery N will flow through the instrument and the starting circuit, including the starting motor O. A double set of indications are placed in connection with the scale and which are respectively used for the low resistance and high resistance shunts. Thus, in testing the starting current, the low resistance shunt being used, readings can be taken from zero to three hundred amperes. When the engine starts and the starting switch M is opened, the current from the generator P will flow through the main circuit, but this is too small in volume to be measured by the low resistance shunt. The operator, therefore, presses the button J, which throws in the high resistance shunt, and readings can then be taken on the same scale from zero to thirty amperes.

The instrument may be converted into a volt meter by turning the switch L and may then be used for testing the generator, lights, horn, etc. Suitable additional markings are placed in connection with the scale for use in these tests.

What I claim as my invention is:

An electrical testing instrument comprising a casing, a pair of terminals in said casings, a metering device connected between said terminals, leads extending from said casing for coupling said terminals into a circuit, a resistor bar extending between said terminals, a third terminal arranged to contact with one of said terminals, a series of resistor bars extending between said third terminal block and the other of said pair of terminals, and manually operable means for electrically disconnecting said third terminal block from said first terminal thereby disconnecting said series of resistance bars, and resilient means for automatically connecting said third and first terminals upon releasing said manually operable means.

In testimony whereof I affix my signature

CHARLES W. TERRY.